United States Patent [19]

Dong-Il

[11] Patent Number: 5,307,164
[45] Date of Patent: Apr. 26, 1994

[54] INTERPOLATION AND SCANNING LINE CONVERTING CIRCUIT

[75] Inventor: Song Dong-Il, Suwon-shi, Rep. of Korea

[73] Assignee: SamSung Electronics Co., Ltd., Suwon, Rep. of Korea

[21] Appl. No.: 821,584

[22] Filed: Jan. 16, 1992

[30] Foreign Application Priority Data

Jan. 22, 1991 [KR] Rep. of Korea .................. 91-1025

[51] Int. Cl.$^5$ .............................................. H04N 7/01
[52] U.S. Cl. ................................... 348/448; 348/607
[58] Field of Search ............... 358/166, 167, 36, 37, 358/140, 11, 160, 138; H04N 5/208, 7/01

[56] References Cited

U.S. PATENT DOCUMENTS

| | | | |
|---|---|---|---|
| 4,706,113 | 11/1987 | Ito | 358/166 |
| 4,967,263 | 10/1990 | Dieterich | 358/140 |
| 5,057,921 | 10/1991 | Robert | 358/140 |

Primary Examiner—James J. Groody
Assistant Examiner—Sherrie Hsia
Attorney, Agent, or Firm—Robert E. Bushnell

[57] ABSTRACT

An interpolation and scanning line converting circuit in a digital television for converting an interlaced scanning signal to a progressive scanning signal by linearly interpolating through a slant correlation of a lowpass interpolation signal and through "0" insertion of a highpass interpolation signal in a vertical direction in order to prevent visual degradation of a vertical direction of an image as well to prevent visual disturbance phenomenon resulted from the interlaced scanning method.

34 Claims, 5 Drawing Sheets

INTERPOLATION AND SCANNING LINE CONVERTING CIRCUIT

FIELD OF THE INVENTION

The present invention relates to an interpolation and scanning line converting circuit for converting an interlaced-scanning signal to a progressive-scanning signal in a television.

DESCRIPTION OF THE PRIOR ART

With the recent development of the digital signal treatment technique and the memoryrelated semiconductor industries, a digital television has been developed to equip with an improved resolution using a 3-dimensional signal treatment method which utilizes the horizontal, vertical and time axis sampling.

However, as it was inevitable to use an expensive field memory or a frame memory to perform the time axis sampling, a scanning line conversion technique employing the 2-dimensional signal that has not been sampled in the time axis direction has been used.

That is to say, when a digitally-converted image signal is input and delayed by 1 horizontal line (1H). The 1H-delayed image signal is added to the input image signal, and then multiplied by ½ in order to produce a linear-interpolated interpolation signal that is vertically situated in between the horizontal lines. A scanning line conversion technique has been employed to linearly provide converted scanning lines by progressively scanning the "vertically-linear-interpolated" interpolation signal and the input image signal.

Here, the term "progressive-scanning" means that every line of the image signal is successively scanned by the scanning electron beam instead of every other line as contemplated by the term "interlaced-scanning". In other words, the term "progressive-scanning" means "non-interlaced-scanning".

If the scanning period of 1 horizontal line for an interlaced scan is 63.5 $\mu$/sec, the input image signal is produced during a 63.5/$\mu$sec and a next 63.5 $\mu$/sec, and the linear-interpolated image signal is then output.

Here, although the downfall of the horizontally-directed resolution is not experienced, the vertically-directed resolution drops down.

In other words, if the vertically-directed resolution of the existing interlaced-scanning method is 525/2 LPH (lines per height), the pass-band following the linear interpolation downgrades to 525/4 LPH.

As evidenced from above, one of the disadvantages in the linear interpolation method is a visual drop of the vertical resolution of an image.

To remedy this deficiency, a slant correlation interpolation method has been suggested. The slant correlation interpolation method comprises the steps of obtaining a pixel value of an interpolation line using a mean value of pixels with high correlations after detecting the correlation of pixels in diagonal directions of right/left and up/down directions in dependence upon the pixels of the interpolation lines.

This slant correlation interpolation method can improve the resolution slightly in the slope line area, however, it can not prevent the visual degradation of the vertical resolution of an image.

SUMMARY OF THE INVENTION

Accordingly, the present invention is designed to prevent the visual degradation of the vertical resolution of a digital image during a conversion of an interlaced-scanning signal to a progressive-scanning signal.

An object of the present invention is to provide an interpolation and scanning line converting circuit for generating an interpolation signal in dependence upon a "0" insertion interpolation at a vertical direction highpass component of an input image signal, and for progressively scanning the interpolation signal by a 2-dimensional interpolation.

Another object of the present invention is to improve the resolution of a slant (slope) line area while removing the visual disturbance phenomenon caused by the structure of the scanning line of the interlaced scanning method.

Still another object of the present invention is to linearly interpolate and to perform a slant-correlation interpolation of the vertical direction lowpass component of the input image signal in order to prevent the visual degradation of the vertical resolution of an image.

A first embodiment of the interpolation circuit of the present invention, comprises:

a vertical bandpass filter for extracting a vertical direction highpass component from an input image signal;

a matching delay for delaying and matching the input image signal for a delay period corresponding to the delay of the vertical bandpass filter to provide a delayed image signal;

a subtractor for providing the vertical direction lowpass component by subtracting the vertical direction highpass component from the delayed image signal;

a linear interpolator for producing a lowpass interpolation signal by linearly interpolating the horizontal lines as opposed to the vertical direction lowpass component;

a "0" insertion interpolator for generating a highpass interpolation signal by inserting "0" into the vertical direction highpass component; and a first adder for providing an interpolation signal by adding the lowpass interpolation signal and the highpass interpolation signal.

A scanning line converting circuit of the present invention can be composed of the interpolation circuit as mentioned above and is further comprised of:

a second adder for restoring the original input image signal by adding the vertical direction highpass component extracted from the vertical bandpass filter of the interpolation circuit and the vertical direction lowpass component extracted from the subtractor of the interpolation circuit; and a double speed converter for progressively scanning the interpolation signal from the first adder of the interpolation circuit and the original input image signal restored by the second adder.

The scanning line converting circuit can also be constructed to prevent visual degradation of the vertical resolution of an image by progressively scanning directly of the original input image signal restored by the second adder and the lowpass interpolation signal produced by the linear interpolator without requiring the "0" insertion interpolator for generating the highpass interpolation signal by inserting "0" into the vertical direction highpass component extracted from the vertical bandpass filter; and the first adder for generating the interpolation signal by adding the lowpass interpolation signal generated by the linear interpolator and the highpass interpolation signal.

A second embodiment of the interpolation circuit of the present invention, comprising:

a vertical bandpass filter for extracting a vertical direction highpass component from an input image signal;

a matching delay for delaying and matching the input image signal by a delay period corresponding to the delay of the vertical bandpass filter to provide a delayed image signal;

a horizontal bandpass blanking filter for extracting a first interpolation band signal by horizontally bandpass filtering the vertical direction highpass component;

a subtractor for providing a second interpolation band signal by subtracting the first interpolation band signal from the delayed image signal;

a slant correlation interpolator for generating a lowpass interpolation signal by interpolating the second interpolation band signal through a slant correlation;

a "0" insertion interpolator for generating a highpass interpolation signal by inserting "0" into the first interpolation band signal; and a first adder for generating an interpolation signal by adding the lowpass interpolation signal and the highpass interpolation signal.

Utilizing the second embodiment of the interpolation circuit according to the present invention, the scanning line converting circuit is further comprised of:

a second adder for restoring the original input image signal by adding the first interpolation band signal extracted from the horizontal band blanking filter of the interpolation circuit and the second interpolation band signal extracted from the subtractor of the interpolation circuit; and a double speed converter for progressively scanning the original input image signal restored from the second adder and the interpolation signal from the first adder of the interpolation circuit.

Similarly, the scanning line converting circuit as described can also be constructed to prevent visual degradation of the vertical resolution of an image by progressively scanning directly of the original input image signal restored by the second adder and the lowpass interpolation signal produced by the slant correlation interpolator without requiring the "0" insertion interpolator for generating the highpasss interpolation signal by inserting "0" into the first interpolation signal; and the first adder for generating the interpolation signal by adding the lowpass interpolation signal and the highpass interpolation signal.

DETAILED DESCRIPTION OF THE INVENTION

Figure 1:
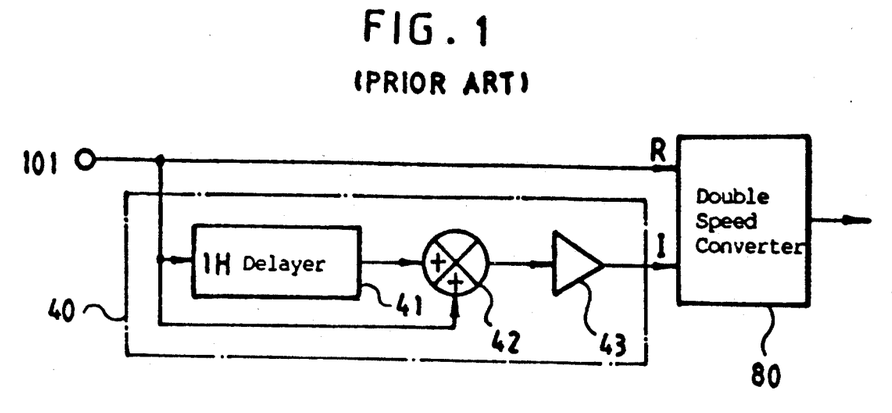
FIG. 1 is a generic view of a scanning line converting circuit.

Referring now to FIG. 1, when an image signal R is input at an input terminal 101, the input image signal is delayed for 1 horizontal line (1H) by a 1H delayer of a linear interpolator 40. The 1H-delayed image signal is added to the input image signal by an adder 42, and multiplied by ½ by a multiplier 43 to produce a vertically-linear-interpolated interpolation signal I among the horizontal lines.

The vertically-linear-interpolated interpolation signal I and the input image signal R are progressively scanned by a double speed converter 80 to produce converted scanning lines.

Figure 2:
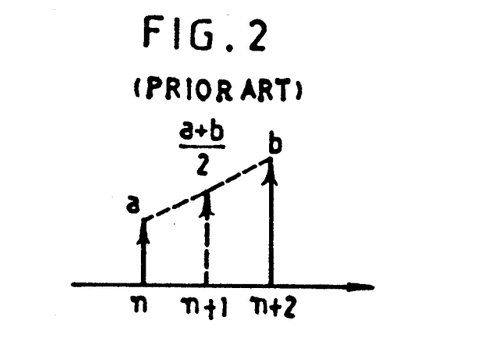
FIG. 2 illustrates a linear interpolation of the scanning line converting circuit in FIG. 1

Referring to FIG. 2, a linear interpolation is resulted from a mean value of the image signal "a" of a 1H-delayed line "n" and the image signal "b" of a current input line n+2. In other words, the image signal "a" and the image signal "b" are added and multiplied by ½ to provide a linear interpolated signal.

Figure 3:
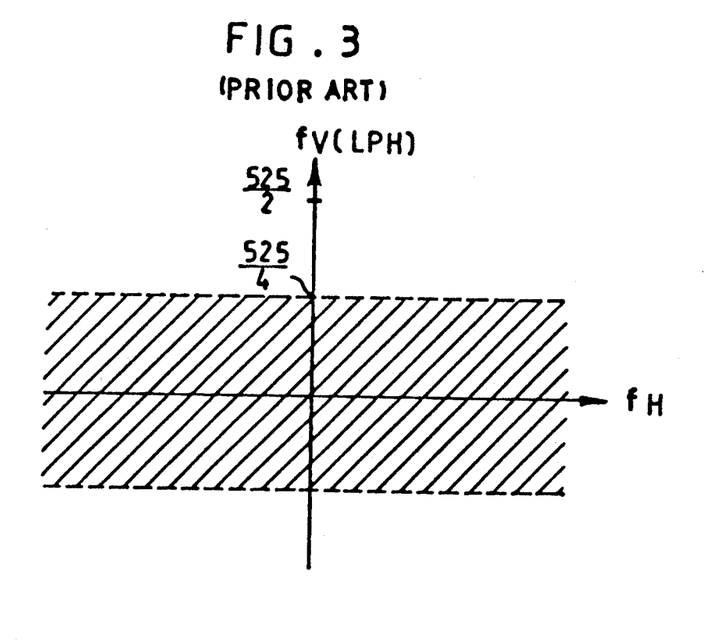
FIG. 3 illustrates a frequency characteristic according to the linear interpolation of FIG. 1

Referring to the linear interpolation according to FIG. 3, wherein a vertical direction resolution is given as 525/2 LPH (line per height), the pass-band after the linear interpolation drops to 525/4 LPH, thereby degrading the vertical resolution of an image.

Figure 4:
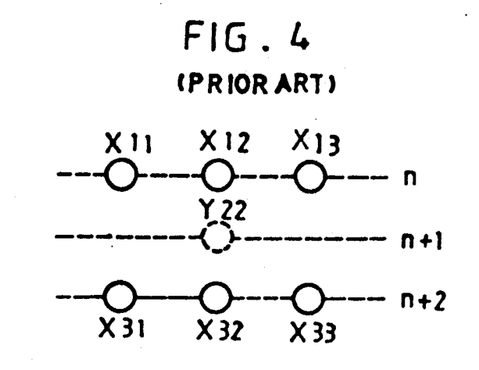
FIG. 4 illustrates a slant correlation interpolation.

A slant correlation interpolation method according to FIG. 4, wherein $X_{11}$, $X_{12}$ and $X_{13}$ are respectively representative of pixels of the image signal on a 1H-delayed line "n", and $X_{31}$, $X_{32}$ and $X_{33}$ are respectively representative of the pixels of the image signal on a current input line "n+2", and $Y_{22}$ is representative of a base pixel of an interpolation line "n+1". The pixel value of the interpolation line is obtained from a mean value of highly correlated pixels, wherein the correlation of pixels is detected in diagonal directions from the left to the right $X_{11}$, $X_{33}$, $X_{13}$, $X_{31}$, and in a vertical direction from $X_{12}$ to $X_{32}$.

In other words, where:

$$X_{11}-X_{33}=\Sigma_1$$

$$X_{12}-X_{32}\Sigma_2$$

$$X_{13}-X_{31}=\Sigma_3$$

The method of obtaining the pixel value $Y_{22}$ of the interpolation line n+1 by averaging the pixels of the 1H-delayed line "n" and the pixels of the current line "n+2" in accordance with the correlations illustrated as follows: Namely, Where $\Sigma_1<\Sigma_2<\Sigma_3$ which yields $Y_{22}=(X_{11}+X_{33})/2$     (1)

Where $\Sigma_2<\Sigma_1<\Sigma_3$ which yields $Y_{22}=(X_{12}+X_{32})/2$     (2)

Where $\Sigma_3<\Sigma_1<\Sigma_2$ which yields $Y_{22}=(X_{13}+X_{31})/2$     (3)

Figure 5:
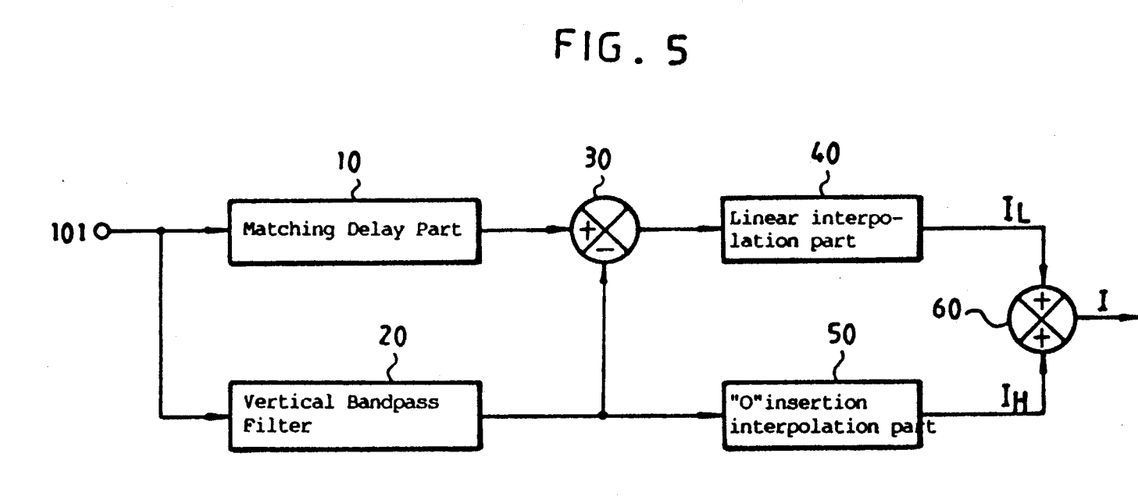
FIG. 5 illustrates a first embodiment of an interpolation circuit of the present invention.

FIG. 5 illustrates a first embodiment of the interpolation circuit of the present invention. This interpolation circuit comprises:

a vertical bandpass filter 20 for extracting a vertical direction highpass component from an input image signal;

a matching delay 10 for delaying and matching the input image signal for a delay period corresponding to the delay of the vertical bandpass filter 20 to provide a delayed image signal;

a subtractor 30 for providing a vertical direction lowpass component by subtracting a vertical direction highpass component from the delayed image signal;

a linear interpolator 40 for generating a lowpass interpolation signal by linear-interpolation of the horizontal lines of the vertical direction lowpass component;

"0" insertion interpolator 50 for generating a highpass interpolation signal by inserting "0" into the vertical direction highpass component extracted by the vertical bandpass filter 20; and a first adder 60 for generating an interpolation signal by adding the lowpass interpolation signal and the highpass interpolation signal.

The interpolation circuit shown in FIG. 5 of the present invention can be explained as follows:

When an image signal is input to an input terminal 101, the input image signal at the vertical bandpass filter 20 passes through a vertical bandpass to produce a vertical direction highpass component. Simultaneously the input image signal passing through the matching delay 10 is delayed for a delay period corresponding to the group delay time of the vertical bandpass filter 20. At the subtractor 30, the vertical direction lowpass component is extracted after subtracting the vertical direction highpass component from the delayed image signal.

The extracted vertical direction highpass component becomes a highpass interpolation signal $I_H$ upon an insertion of "0" by the "0" insertion interpolator 50 while the vertical direction lowpass component becomes a lowpass interpolation signal $I_L$ upon a linear and vertical interpolation of the horizontal lines by the linear interpolator 40.

The highpass interpolation signal $I_H$ and the lowpass interpolation signal $I_L$ are then added by a first adder 60 to produce the interpolation signal I.

Figure 6:
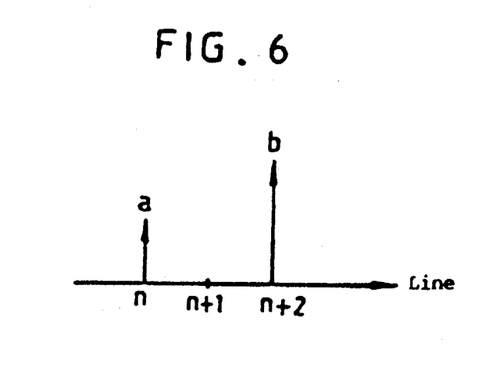
FIG. 6 illustrates a "0" insertion interpolation in FIG. 5

Here, the "0" insertion interpolation, as illustrated in FIG. 6, denotes the image signal of the interpolation line "n+1" between the 1H delay line "n" and the current line "n+2" being leveled to "0".

Figure 7:
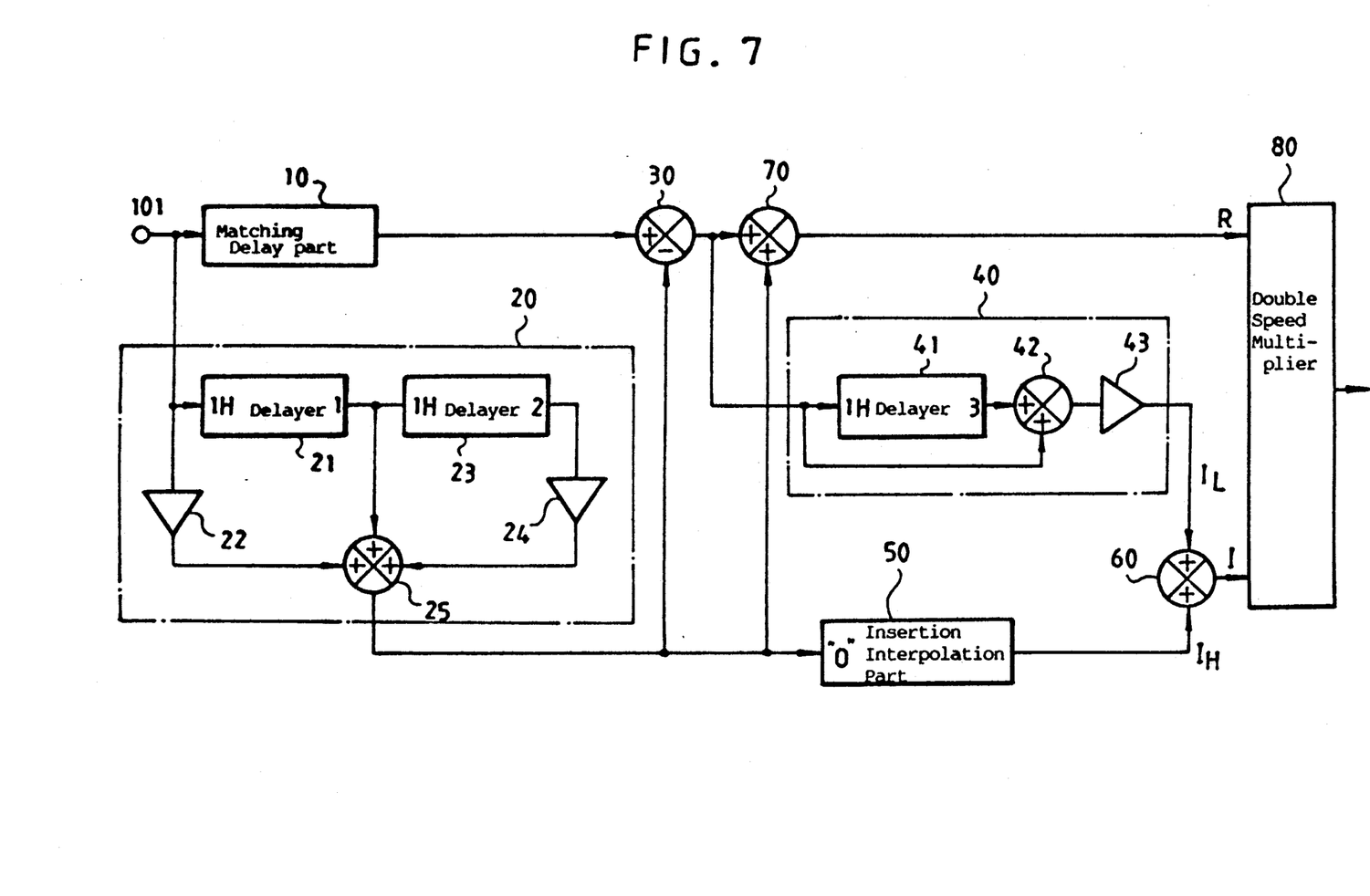
FIG. 7 illustrates a scanning line converting circuit employing the interpolation circuit in FIG. 5 of the present invention.

FIG. 7 illustrates a scanning line converting circuit employing the interpolation circuit in FIG. 5 of the present invention. The scanning line converting circuit comprises:

a vertical bandpass filter 20 for extracting a vertical direction highpass component from an input image signal;

a matching delay 10 for delaying and matching the input image signal for a delay period corresponding to the delay of the vertical bandpass filter 20 to provide a delayed image signal;

a subtractor 30 for extracting a vertical direction lowpass component by subtracting the vertical direction highpass component extracted from the delayed image signal;

a linear interpolator 40 for generating a lowpass interpolation signal $I_L$ by linear-interpolation of the horizontal lines of the vertical direction lowpass component extracted by the vertical bandpass filter 20; a "0" insertion interpolator 50 for generating a highpass interpolation signal $I_H$ by inserting "0" into the vertical direction highpass component extracted by the vertical bandpass filter 20;

a first adder 60 for generating an interpolation signal I by adding the lowpass interpolation signal $I_L$ and the highpass interpolation signal $I_H$;

a second adder 70 for restoring the original image signal R by adding the vertical direction highpass component output from the vertical bandpass filter 20 and the vertical direction lowpass component output from subtractor 30; and a double speed converter for progressively scanning the original image signal R restored from the second adder 70 and the interpolation signal I output from the first adder 60.

The vertical bandpass filter 20 in FIG. 7 is further comprised of:

a first 1H delayer 21 for delaying the input image signal from an input terminal 101 by 1 horizontal line;

a second 1H delayer 23 for delaying the output of the first 1H delayer 21 by 1 horizontal line;

first and second multipliers 22 and 24 for multiplying the input image signal and the output of the second 1H delayer 23 by ½ respectively; and a third adder 25 for outputting the vertical direction highpass component by adding the output of the 1H delayer 21 and the outputs of the first and second multipliers 22 and 24.

The linear interpolator 40, as mentioned above, delays the vertical direction lowpass component of the input image signal for 1 horizontal line by a 1H delayer 41, adds the vertical direction lowpass component of the input image signal with the output of the 1H delayer by a fourth adder 42, and multiplies the output of the fourth adder 42 by ½ using a third multiplier 43 to generate the lowpass interpolation signal $I_L$ by linear-interpolation of the vertical direction lowpass component.

In accordance with FIG. 7, when the image signal is input at an input terminal 101, the input image signal is multiplied by ½ at the first multiplier 22, and simultaneously delayed by 1 horizontal line at the first 1H delayer 21. The input image signal delayed by 1 horizontal line at the first 1H delayer 21 is again delayed by 1 horizontal line at the second delayer 23 and then multiplied by ½ at the second multiplier, and finally input into the third adder 25. The input image signal is synchronized to the vertical direction highpass component extracted from the adder 25 of the vertical bandpass filter 20 by the matching delay 10. Accordingly, the vertical direction lowpass component is extracted by subtracting the vertical direction highpass component from the delayed image signal of the matching delay 10 at the subtractor 30. The lowpass interpolation signal $I_L$ is output by the linear interpolator 40 in dependence upon a linear interpolation of the vertical direction lowpass component. The highpass interpolation signal $I_H$ is output by the "0" insertion interpolator 50 in dependence upon a "0" insertion and interpolation of the vertical direction highpass component.

The interpolation signal I at the first adder 60 is generated by adding the lowpass interpolation signal $I_L$ output from the linear interpolation 40 and the highpass interpolation signal $I_H$ output from the "0" insertion interpolator 50. Also the original image signal R at the second adder 70 is restored by adding the vertical direction highpass component extracted from the vertical bandpass filter 20 and the vertical direction lowpass component extracted from the subtractor 30. The double speed converter 80 is used to progressively scan the restored original image signal R and the interpolation signal I. Accordingly, the scanning line converting circuit utilizing the interpolation circuit of the present invention improves the vertical resolution while maintaining high frequency characteristics in accordance with a user's visual characteristics. It also eliminates visual disturbance phenomenon of the scanning line structure occurred by the linear interpolation of the lowpass interpolation signal $I_L$.

The same operation as described above can also be obtained when the "0" insertion interpolator 50 and the first adder 60 are removed, and when the lowpass interpolation signal $I_L$ output from the linear interpolator 40 is delivered directly to the double speed scanning converter 80 as an interpolation signal 1. In other words, the double speed scanning converter 80 can either progressively scan the original image signal R from the second adder 70 and the interpolation signal I from the first adder 60 or progressively scan the original image signal R from the second adder 70 and the lowpass interpolation signal $I_L$ in the form of the interpolation signal I to achieve similar results in preventing the visual degradation of the vertical resolution of an image. The insertion of "0" into the vertical direction highpass component by the "0" insertion interpolator 50 to produce the interpolation signal I to the double speed scanning converter 80 has the same result or effect with the progressive scanning of the lowpass interpolation signal $I_L$ from the linear interpolator 40 to the interpolation line in the form of interpolation signal I.

Figure 8:
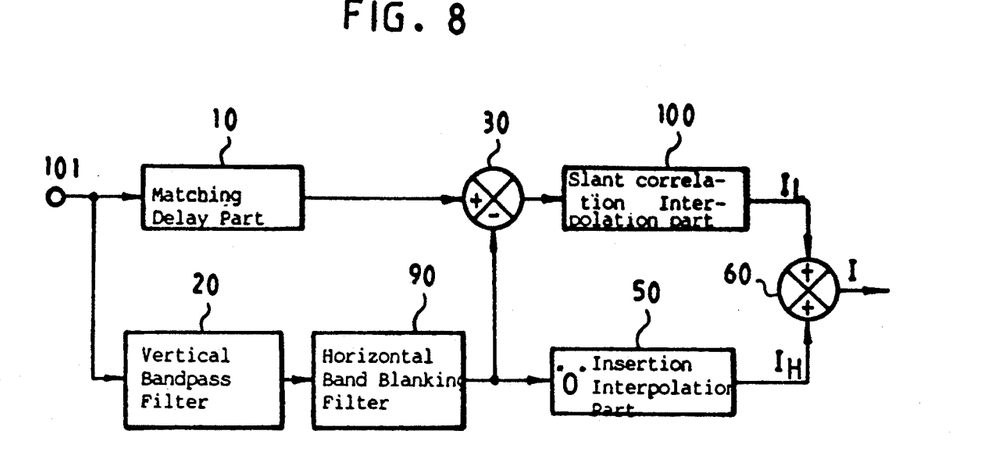
FIG. 8 illustrates a second embodiment of an interpolation circuit of the present invention.

FIG. 8 illustrates a second embodiment of an interpolation circuit of the present invention. This interpolation circuit comprises:

a vertical bandpass filter 20 for providing a vertical direction highpass component from an input image signal;

a matching delay 10 for delaying and matching the input image signal for a delay period corresponding to the delay of the vertical bandpass filter 20 to provide a delayed image signal;

a horizontal band blanking filter 90 for extracting a first interpolation band signal by "horizontal-band blanking and filtering" the vertical direction highpass component;

a subtractor 30 for providing a second interpolation band signal by subtracting the first interpolation band signal from the delayed image signal;

a slant correlation interpolator 100 for generating a lowpass interpolation signal by interpolating the second interpolation band signal through a slant correlation;

a "0" insertion interpolator 50 for producing a highpass interpolation signal by inserting "0" into the first interpolation band signal;

a first adder 60 for outputting an interpolation signal by adding the lowpass and highpass interpolation signals.

Figure 9:
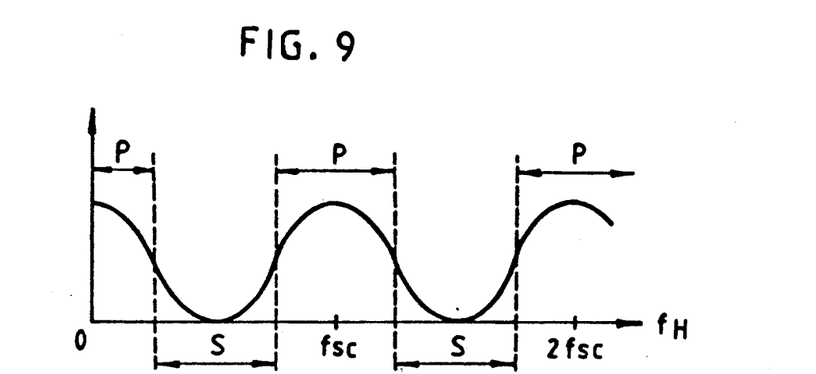
FIG. 9 illustrates a frequency characteristic of a horizontal band blanking filter in FIG. 8

FIG. 9 illustrates a frequency characteristic of a horizontal band blanking filter 90 of FIG. 8.

Figure 10:
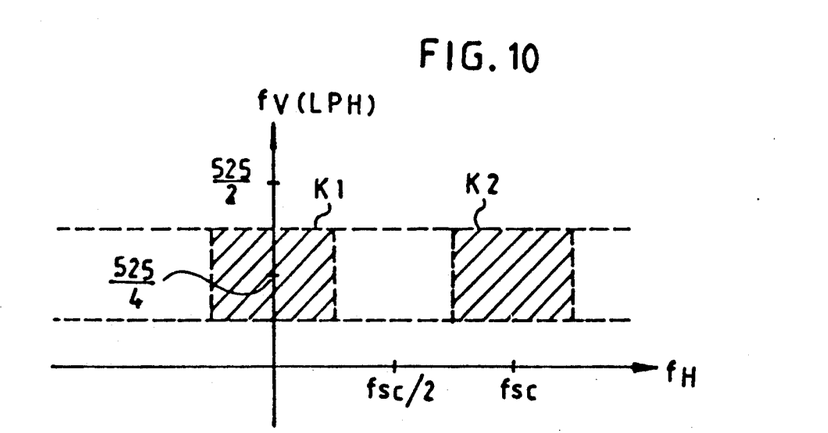
FIG. 10 illustrates a frequency domain characteristic of an interpolation circuit in FIG. 8

FIG. 10 illustrates an interpolation domain of FIG. 8, wherein the oblique-lined domain of $K_1$ and $K_2$, is a "0" insertion interpolation domain, and the balance is a slant correlation interpolation domain.

The other embodiment of the present invention as illustrated in FIG. 8 is described with reference to the frequency characteristic as shown in FIG. 9 and the interpolation domain as shown in FIG. 10.

Once the digitally-converted image signal according to FIG. 8 is input into an input terminal 101, the input image signal is filtered through a vertical bandpass by the vertical bandpass filter 20 to produce a vertical direction highpass component.

Simultaneously the input image signal is delayed by the matching delay 10 for delay period corresponding to the delay of the vertical bandpass filter 20. At the horizontal band blanking filter 90, the "0" insertion interpolation domain which is an oblique-line area as shown in FIG. 10 by $K_1$ and $K_2$ only extracts the first interpolation band signal. Here, the frequency characteristic of the horizontal band blanking filter 90 is shown in FIG. 9, wherein a reference code "P" denotes a passband and "S" shows a stop band.

At the adder 30, the slant correlation interpolation domain excludes the "0" insertion interpolation area. In other words, the portion that rules out the oblique-line area $K_1$ and $K_2$ extracts the second interpolation band signal.

The first interpolation band signal to be interpolated by a "0" insertion becomes a highpass interpolation signal $I_H$ at the "0" insertion interpolator 50 while the second interpolation band signal to be interpolated by a slant correlation becomes a lowpass interpolation signal $I_L$ at the slant correlation interpolator 100.

The first interpolation band signal to be interpolated by a "0" insertion in the highpass component separated from the vertical bandpass filter 20 becomes a signal excludable from a band signal for enhancing the vertical resolution.

The second interpolation band signal to be interpolated by a slant correlation becomes a signal excludable from the first interpolation signals $K_1$ and $K_2$, namely the lowpass interpolation signal $I_L$ for improving the vertical resolution in the slant area.

Therefore, an improved vertical resolution in a slant area along with the prevention of the visual degradation of the vertical resolution in a "0" insertion interpolation domain can be achieved.

Figure 11:
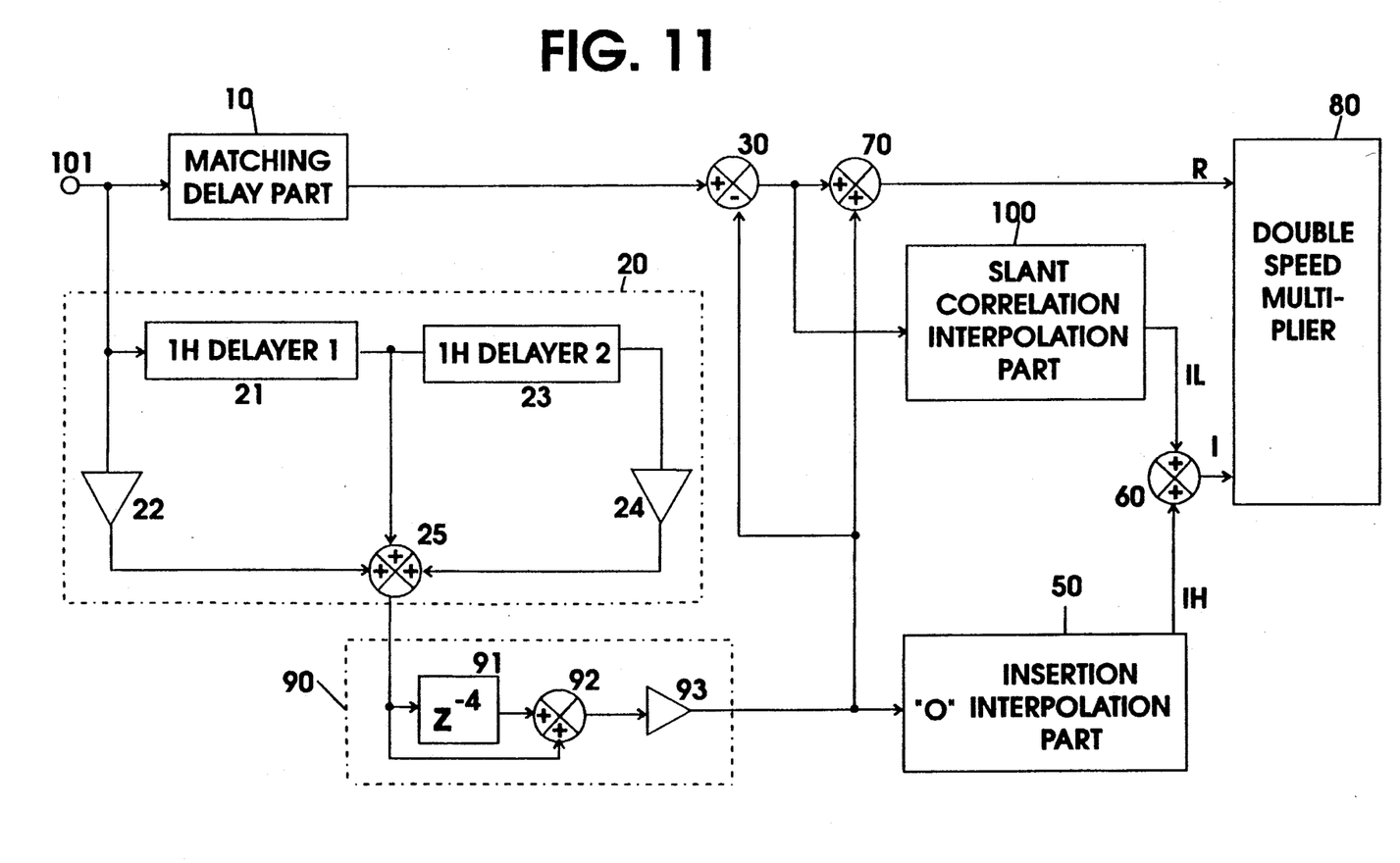
FIG. 11 illustrates a scanning line converting circuit employing an interpolation circuit in FIG. 8 of the present invention.

FIG. 11 illustrates a scanning line converting circuit employing an interpolation circuit in FIG. 8 of the present invention. The scanning line converting circuit comprises:

a vertical bandpass filter 20 for providing a vertical direction highpass component from an input image signal;

a matching delay 10 for delaying and matching the input image signal for a delay period corresponding to the delay at the vertical bandpass filter 20 to provide a delayed image signal;

a horizontal band blanking filter 90 for extracting a first interpolation band signal by blank-filtering the vertical highpass component at a horizontal band;

a subtractor 30 for providing a second interpolation band signal by subtracting the first interpolation band signal from the delayed image signal;

a slant correlation interpolator 100 for generating a lowpass interpolation signal by interpolating the second interpolation band signal through a slant correlation;

a first adder 70 for restoring the original image signal R by adding the first interpolation band signal (which is the output of the horizontal band blanking filter 90) and the second interpolation band pass signal (which is the output of the subtractor 30); and a double speed converter 80 for progressively scanning the lowpass interpolation signal $I_L$ output from the slant correlation interpolator 100 and the original image signal R restored from the adder 70.

The vertical band pass filter 20 as shown in FIG. 11 is comprised of:

a first 1H delayer 21 for delaying the input image signal from the input terminal 101 for 1 horizontal line;

a second 1H delayer 23 for delaying the output of the first delayer 21 by 1 horizontal line;

first and second multipliers 22 and 24 for multiplying the input image signal and the out of the second delayer 23 by ½ respectively; and a third adder 25 for outputting the vertical direction highpass component by adding the image signal delayed by 1 horizontal line at the 1H delayer 21 to the output of the first and second multipliers 22 and 24.

The horizontal band blanking filter 90 as shown in FIG. 11 is comprised of:

a delayer 91 for delaying the vertical direction highpass component output from the third adder 25 of the vertical bandpass filter 20 by 4 pixels;

a fourth adder 92 for adding the vertical direction highpass component output from the third adder 25 of the vertical bandpass filter 20 and the vertical direction highpass component delayed by 4 pixels at the delayer 91; and a third multiplier 93 for averaging the vertical direction highpass component value by multiplying the vertical direction highpass component value output from the fourth adder 92 by ½;

The detailed explanation of the scanning line converting circuit as shown in FIG. 11 is described as follows:

Once the digitally-converted image signal is input into the input terminal 101, the vertical bandpass filter 20 filters the input image signal by a vertical bandpass to extract a vertical direction highpass component from the input image signal.

The matching delay 10 delays and matches the input image signal for a delay period corresponding to the delay of the vertical bandpass filter 20.

The horizontal band blanking filter 90 extracts a first interpolation band signal from the vertical direction highpass component by blank-filtering through a horizontal band of the vertical direction highpass component.

The subtractor 30 extracts a second interpolation band signal by subtracting the first interpolation band signal (which is extracted from the horizontal band blanking filter 90) from the delayed image signal delayed by the matching delay 10.

The slant correlation interpolator 100 generates a lowpass interpolation signal $I_L$ by interpolating the second interpolation band signal through a slant correlation.

A "0" insertion interpolator 50 generates a highpass interpolation signal $I_H$ by inserting "0" into the first interpolation band signal.

A first adder 60 generates an interpolation signal I by adding the lowpass interpolation signal $I_L$ output from the slant correlation interpolator 100 and the highpass interpolation signal $I_H$ output from the "0" insertion interpolator 50.

A second adder 70 restores the original image signal R by adding the first and second interpolation band signals $I_L$ and $I_H$.

A double speed converter 80 generates a progressive-scanning signal having an improved vertical resolution in an image in dependence upon reception of the restored original image signal R and the interpolation signal I.

With reference to the horizontal band blanking filter 90, the delayer 91 delays the vertical direction highpass component separated from the vertical bandpass filter 20 by 4 pixels in order to provide the first interpolation band signal similar to the "0" insertion interpolation domain (K1, K2) as shown in the oblique-lines of FIG. 10. The fourth adder 92 adds the delayed vertical direction highpass component and the current vertical direction highpass component to provide an added signal for subsequent multiplication of ½ by the third multiplier 93.

The same performance as mentioned above can also be obtained without the "0" insertion interpolator 50 and the first adder 60 as shown in FIG. 11. In this case, the output of the slant correlation interpolator 100 is delivered directly to the double speed scanning converter 80 as an interpolation signal I. As previously mentioned, the advantage of the present invention is that, as an original input image signal, the progressive scanning interpolation using the scanning line conversion circuit is used to prevent visual degradations in the vertical direction of an image as well as to prevent visual hindrance phenomenons occurred by a scanning line structure of the interlaced scan method without employing expensive field and frame memories.

While preferred embodiment of the present invention have been particularly shown and described, it will be understood by those skilled in the art that foregoing and other changes in form and details may be made without departing from the spirit and scope of the present invention.

What is claimed is:

1. An interpolation circuit, comprising:
   vertical bandpass filter means for extracting a vertical direction highpass signal from an input image signal;
   matching delay means for delaying the input image signal for a delay period to provide a delayed image signal;
   subtractor means for extracting a vertical direction lowpass signal by subtracting the vertical direction highpass signal from the delayed image signal;
   linear interpolation means for generating a lowpass interpolation signal by linear-interpolating between horizontal lines of the vertical direction lowpass signal;
   "0" insertion interpolation means for generating a highpass interpolation signal by inserting "0" between vertical lines of the vertical direction highpass signal; and
   first adder means for generating an interpolation signal by adding the lowpass interpolation signal to the highpass interpolation signal.

2. The interpolation circuit according to claim 1, wherein the delay period of said matching delay means corresponds to a time necessary for said vertical bandpass filter means to extract the vertical direction highpass signal from the input image signal.

3. An interpolation circuit according to claim 1, wherein said vertical bandpass filter means comprises:
   first 1H delay means for delaying the input image signal by 1 horizontal line to provide a 1H delayed image signal;
   second 1H delay means for delaying the 1H delayed image signal by 1 horizontal line to provide a 2H delayed image signal;

first multiplier means for multiplying the input image signal by ½ to provide a first multiplied image signal;

second multiplier means for multiplying the 2H delayed image signal to provide a second multiplied image signal; and second adder means for adding the first and second multiplied image signals and the 1H delayed image signal to provide said vertical direction highpass signal.

4. A scanning line converting circuit, comprising:

vertical bandpass filter means for extracting a vertical direction highpass signal from an input image signal;

matching delay means for delaying the input image signal for a delay period to provide a delayed image signal;

subtractor means for extracting a vertical direction lowpass signal by subtracting the vertical direction highpass signal from the delayed image signal;

linear interpolation means for generating a lowpass interpolation signal in dependence upon a linear interpolation of horizontal lines of the vertical direction lowpass signal;

first adder means for restoring the input image signal by adding the vertical direction highpass signal and the vertical direction lowpass signal to provide a restored image signal; and double speed scan converter means for progressively scanning the restored image signal and an interpolation signal to provide a progressive scanning signal.

5. The scanning line converting circuit according to claim 4, further comprising:

"0" insertion interpolation means for generating a highpass interpolation signal by inserting "0" between vertical lines of the vertical direction highpass signal; and second adder means for adding the highpass interpolation signal to the lowpass interpolation signal to provide said interpolation signal.

6. The scanning line converting circuit according to claim 4, wherein said vertical bandpass filter means comprises:

first 1H delay means for delaying the input image signal by 1 horizontal line to provide a 1H delayed image signal;

second 1H delay means for delaying the 1H delayed image signal by 1 horizontal line to provide a 2H delayed image signal;

means for respectively multiplying the input image signal and the 2H delayed image signal by ½ to provide first and second multiplied image signals; and second adder means for adding the first and second multiplied image signals and the 1H delayed image signal to provide said vertical direction highpass signal.

7. An interpolation circuit, comprising:

vertical bandpass filter means for extracting a vertical direction highpass signal from an input image signal;

matching delay means for delaying the input image signal for a delay period to provide a delayed image signal;

horizontal band blanking filter means for extracting a first interpolation band signal from the vertical direction highpass signal;

subtractor means for extracting a second interpolation band signal by subtracting the first interpolation band signal from the delayed image signal;

slant correlation interpolation means for generating a lowpass interpolation signal by interpolating slant correlations of the second interpolation band signal;

"0" insertion interpolation means for generating a highpass interpolation signal by inserting "0" between vertical lines of the first interpolation band signal; and first adder means for outputting an interpolation signal by adding the lowpass interpolation signal and the highpass interpolation signal.

8. The interpolation circuit according to claim 7, wherein said vertical bandpass filter means comprises:

first 1H delay means for delaying the input image signal by 1 horizontal line to provide a 1H delayed image signal;

second 1H delay means for delaying the 1H delayed image signal by 1 horizontal line to provide a 2H delayed image signal;

first multiplier means for multiplying the input image signal by ½ to provide a first multiplied image signal;

second multiplier means for multiplying the 2H delayed image signal to provide a second multiplied image signal; and second adder means for adding the first and second multiplied image signals and the 1H delayed image signal to provide said vertical direction highpass signal.

9. The interpolation circuit according to claim 7, wherein said horizontal band blanking filter means comprises:

4P delay means for delaying the vertical direction highpass signal by 4-pixels to provide a 4P delayed highpass signal;

second adder means for adding the 4P delayed highpass signal and the vertical direction highpass signal to provide an added highpass signal; and multiplier means for multiplying the added highpass signal by ½ to provide said first interpolation band signal.

10. The interpolation circuit according to claim 7, wherein the delay period of said matching delay means corresponds to a time necessary for said vertical bandpass filter means to extract the vertical direction highpass signal from the input image signal.

11. The interpolation circuit according to claim 8, wherein said horizontal band blanking filter means comprises:

4P delay means for delaying the vertical direction highpass signal by 4-pixels to provide a 4P delayed highpass signal;

third adder means for adding the 4P delayed highpass signal and the vertical direction highpass signal to provide an added highpass signal; and third multiplier means for multiplying the added highpass signal by ½ to provide said first interpolation band signal.

12. A scanning line converting circuit, comprising:

vertical bandpass filter means for extracting a vertical direction highpass signal from an input image signal;

matching delay means for delaying the input image signal for a delay period to provide a delayed image signal;

horizontal band blanking filter means for extracting a first interpolation band signal by horizontally band filtering the vertical direction highpass signal;

subtractor means for extracting a second interpolation band signal by subtracting the first interpolation band signal from the delayed image signal;

adder means for adding the first interpolation band signal and the second interpolation band signal to provide a restored image signal;

double speed scan converter means for generating a progressive scanning signal in dependence upon reception of said restored image signal and an interpolation signal.

13. The scanning line converting circuit according to claim 12, further comprising:

"0" insertion interpolation means for generating a highpass interpolation signal by inserting "0" between vertical lines of the first interpolation band signal;

slant correlation interpolation means for generating a lowpass interpolation signal by interpolating slant correlations of the second interpolation band signal; and second adder means for generating said interpolating signal by adding the lowpass interpolation signal and the high pass interpolation signal.

14. The scanning line converting circuit according to claim 12, wherein said vertical bandpass filter means comprises:

first 1H delay means for delaying the input image signal by 1 horizontal line to provide a 1H delayed image signal;

second 1H delayed means for delaying the 1H delayed image signal by 1 horizontal line to provide a 2H delayed image signal;

first multiplier means for multiplying the input image signal by ½ to provide a first multiplied image signal;

second multiplier means for multiplying the 2H delayed image signal to provide a second multiplied image signal; and second adder means for adding the first and second multiplied image signals and the 1H delayed image signal to provide said vertical direction highpass signal.

15. The scanning line converting circuit according to claim 12, wherein said horizontal band blanking filter means comprises:

4P delay means for delaying the vertical direction highpass signal by 4-pixels to provide a 4P delayed highpass signal;

second adder means for adding the 4P delayed highpass signal and the vertical direction highpass signal to provide an added highpass signal; and multiplier means for multiplying the added highpass signal by ½ to provide said first interpolation band signal.

16. A method for converting an interlaced scanning signal into a progressive scanning signal, comprising the steps of:

receiving an image signal representative of said interlaced scanning signal;

delaying the image signal for a delay period to provide a delayed image signal;

filtering the image signal in a vertical direction to provide a vertical highpass signal;

inserting "0" between vertical scanning lines of said vertical highpass signal to generate an inserted vertical highpass signal and interpolating the inserted vertical highpass signal to provide a highpass interpolation signal;

subtracting the vertical highpass signal from the delayed image signal to provide a vertical lowpass signal;

linearly interpolating between horizontal scanning lines of the vertical lowpass signal to provide a lowpass interpolation signal;

adding the highpass interpolation signal and the lowpass interpolation signal to provide an interpolation signal;

adding the vertical lowpass signal and the vertical highpass signal to provide a restored image signal representative of said image signal; and progressively scanning the restored image signal and the interpolation signal to provide the progressive scanning signal.

17. The method for converting an interlaced scanning signal into a progressive scanning signal according to claim 16, wherein the highpass filtering step comprises the steps of:

delaying the image signal by 1 horizontal line to provide a 1H delayed image signal;

delaying the 1H delayed image signal by 1 horizontal line to provide a 2H delayed image signal;

multiplying the image signal by ½ to provide a first multiplied image signal;

multiplying the 2H delayed image signal to provide a second multiplied image signal; and adding the first and second multiplied image signals and the 1H delayed image signal to provide said vertical highpass signal.

18. The method for converting an interlaced scanning signal into a progressive scanning signal according to claim 16, wherein the linear interpolating step comprises the steps of:

delaying the vertical lowpass signal by 1 horizontal line to provide a 1H delayed lowpass signal;

adding the 1H delayed lowpass signal and the vertical lowpass signal to provide an added lowpass signal; and multiplying the added lowpass signal by ½ to provide said lowpass interpolation signal.

19. A method for converting an interlaced scanning signal into a progressive scanning signal, comprising the steps of:

receiving an image signal representative of said interlaced scanning signal;

delaying the image signal for a delay period to provide a delayed image signal;

filtering the image signal in a vertical direction to provide a vertical highpass signal;

filtering the vertical highpass signal in a horizontal direction during a blanking period to provide a first interpolation band signal;

inserting "0" between vertical scanning lines of said first interpolation band signal to generate an inserted signal and interpolating the inserted signal to provide a highpass interpolation signal;

subtracting the first interpolation band signal from the delayed image signal to provide a second interpolation band signal;

interpolating between slant correlations of the second interpolation band signal to provide a lowpass interpolation signal;

adding the highpass interpolation signal and the lowpass interpolation signal to provide an interpolation signal;

adding the first interpolation band signal and the second interpolation band signal to provide a restored image signal representative of said image signal; and progressively scanning the restored image signal and the interpolation signal to provide the progressive scanning signal.

20. The method for converting an interlaced scanning signal into a progressive scanning signal according to claim 19, wherein the vertical highpass filtering step comprises the steps of:

delaying the image signal by 1 horizontal line to provide a 1H delayed image signal;

delaying the 1H delayed image signal by 1 horizontal line to provide a 2H delayed image signal;

multiplying the image signal by 178 to provide a first multiplied image signal;

multiplying the 2H delayed image signal to provide a second multiplied image signal; and adding the first and second multiplied image signals and the 1H delayed image signal to provide said vertical highpass signal.

21. The method for converting an interlaced scanning signal into a progressive scanning signal according to claim 19, wherein the step of filtering the vertical highpass signal comprises the steps of:

delaying the vertical highpass signal by 4 pixels to provide a 4P delayed highpass signal;

adding the 4P delayed highpass signal and the vertical highpass signal to provide an added highpass signal; and multiplying the added highpass signal by ½ to provide said first interpolation band signal.

22. A scanning line converting circuit for converting an interlaced scanning signal into a progressive scanning signal, comprising:

means for receiving an image signal representative of said interlaced scanning signal;

means for filtering the image signal in a vertical direction to provide a vertical highpass signal;

means for subtracting the vertical highpass signal from the image signal in a proper time relationship to provide a vertical lowpass signal;

means for interpolating between horizontal scanning lines of the vertical lowpass signal to provide a lowpass interpolation signal;

means for inserting "0" between vertical scanning lines of said vertical highpass signal to generate a highpass interpolation signal;

means for adding the vertical lowpass signal and the vertical highpass signal to provide a restored image signal representative of said image signal, and for adding the highpass interpolation signal and the lowpass interpolation signal to provide an interpolation signal; and means for progressively scanning the restored image signal and the interpolation signal to provide the progressive scanning signal.

23. The scanning line converting circuit according to claim 22, wherein said highpass filtering means comprises:

first delay means for delaying the image signal by 1 horizontal line to provide a 1H delayed image signal;

second delay means for delaying the 1H delayed image signal by 1 horizontal line to provide a 2H delayed image signal;

first multiplier means for multiplying the image signal by ½ to provide a first multiplied image signal;

second multiplier means for multiplying the 2H delayed image signal to provide a second multiplied image signal; and means for adding the first and second multiplied image signals and the 1H delayed image signal to provide said vertical highpass signal.

24. The scanning line converting circuit according to claim 22, wherein said interpolating means comprises:

means for delaying the vertical lowpass signal by 1 horizontal line to provide a 1H delayed lowpass signal;

means for adding the 1H delayed lowpass signal and the vertical lowpass signal to provide an added lowpass signal; and means for multiplying the added lowpass signal by ½ to provide said lowpass interpolation signal.

25. The scanning line converting circuit according to claim 22, wherein said interpolating means interpolates the vertical lowpass signal through a slant correlation to provide said lowpass interpolation signal.

26. The scanning line converting circuit according to claim 22, further comprising blanking means interposed between said highpass filtering means and said adding means, for highpass filtering the vertical highpass signal in a horizontal direction during a blanking period.

27. The scanning line converting circuit according to claim 26, wherein said blanking means comprises:

means for delaying the vertical highpass signal by 4 pixels to provide a 4P delayed highpass signal;

means for adding the 4P delayed highpass signal and the vertical highpass signal to provide an added highpass signal; and means for multiplying the added highpass signal by 178.

28. A scanning line converting circuit for converting an interlaced scanning signal into a progressive scanning signal, comprising:

means for receiving an image signal representative of said interlaced scanning signal;

means for highpass filtering the image signal in a vertical direction to provide a vertical highpass signal;

means for obtaining a vertical lowpass signal from the vertical highpass signal and the image signal;

means for interpolating between horizontal scanning lines of the vertical lowpass signal to provide a lowpass interpolation signal;

means for generating a highpass interpolation signal by inserting data between vertical scanning lines of said vertical highpass signal;

means for obtaining a restored image signal representative of said image signal by adding the vertical lowpass signal and the vertical highpass signal to provide, and for providing an interpolation signal by adding the highpass interpolation signal and the lowpass interpolation signal; and means for progressively scanning the restored image signal and the interpolation signal.

29. The scanning line converting circuit according to claim 28, wherein said highpass filtering means comprises:

first delay means for delaying the image signal by one horizontal line to provide a first delayed image signal;

second delay means for delaying the first delayed image signal by one horizontal line to provide a second delayed image signal;

first multiplier means for multiplying the image signal by a first factor to provide a first multiplied image signal;

second multiplier means for multiplying the second delayed image signal to provide a second multiplied image signal; and means for generating said vertical highpass signal in dependence upon the first and second multiplied image signals and the first delayed image signal.

30. The scanning line converting circuit according to claim 28, wherein said interpolating means comprises:
means for delaying the vertical lowpass signal by one horizontal line to provide a delayed lowpass signal;
means for adding the delayed lowpass signal and the vertical lowpass signal to provide an added lowpass signal; and
means for generating said lowpass interpolation signal by multiplying the added lowpass signal by a given factor.

31. The scanning line converting circuit according to claim 28, wherein said interpolating means generates said lowpass interpolation signal by interpolating the vertical lowpass signal through a slant correlation.

32. The scanning line converting circuit according to claim 28, further comprising blanking means for highpass filtering the vertical highpass signal in a horizontal direction during a blanking period prior to obtaining said vertical lowpass signal.

33. The scanning line converting circuit according to claim 32, wherein said blanking means comprises:
means for providing a delayed highpass signal by delaying the vertical highpass signal;
means for providing an added highpass signal in dependence upon the delayed highpass signal and the vertical highpass signal; and
means for multiplying the added highpass signal by a given factor.

34. The scanning line converting circuit according to claim 28, wherein:
said highpass filtering means comprises:
first delay means for delaying the image signal by one horizontal line to provide a first delayed signal;
second delay means for delaying the first delayed signal by one horizontal line to provide a second delayed signal;
means for generating said vertical highpass signal in dependence upon the first and second delayed signal and the image signal; and
said interpolating means comprising:
means for delaying the vertical lowpass signal by one horizontal line to provide a third delayed signal; and
means for generating said lowpass interpolation signal in dependence upon the third delayed signal and the vertical lowpass signal.

* * * * *

UNITED STATES PATENT AND TRADEMARK OFFICE
CERTIFICATE OF CORRECTION

PATENT NO. : 5,307,164
DATED      : April 26, 1994
INVENTOR(S) : Dong-IL Song

It is certified that error appears in the above-indentified patent and that said Letters Patent is hereby corrected as shown below:

On the Title Page, Item [75], the inventor should read
--Dong-IL Song--.

Signed and Sealed this

Twelfth Day of July, 1994

Attest:

BRUCE LEHMAN

Attesting Officer        Commissioner of Patents and Trademarks